(12) United States Patent  (10) Patent No.: US 8,068,189 B2
Ichikawa  (45) Date of Patent: Nov. 29, 2011

(54) LIQUID CRYSTAL DISPLAY AND LIQUID CRYSTAL PROJECTOR

(75) Inventor: Takeshi Ichikawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 428 days.

(21) Appl. No.: 11/751,157

(22) Filed: May 21, 2007

(65) Prior Publication Data

US 2007/0279570 A1 Dec. 6, 2007

(30) Foreign Application Priority Data

May 30, 2006 (JP) .................................. 2006-149894

(51) Int. Cl.
*G02F 1/1335* (2006.01)
*G02F 1/1333* (2006.01)
*G02F 1/1345* (2006.01)
(52) U.S. Cl. ............... 349/40; 349/5; 349/150; 349/113
(58) Field of Classification Search ................... 349/40, 349/5–10, 113, 149–152
See application file for complete search history.

(56) References Cited

U.S. PATENT DOCUMENTS

| 5,311,342 | A | * | 5/1994 | Watanabe | 349/152 |
| 6,078,371 | A | | 6/2000 | Ichikawa et al. | 349/95 |
| 6,132,800 | A | | 10/2000 | Shimada et al. | 427/108 |
| 6,271,897 | B1 | | 8/2001 | Ichikawa et al. | 349/43 |
| 6,356,332 | B1 | | 3/2002 | Ichikawa et al. | 349/146 |
| 6,384,890 | B1 | * | 5/2002 | Takiar et al. | 349/150 |
| 6,466,285 | B1 | | 10/2002 | Ichikawa | 349/95 |
| 6,839,097 | B2 | * | 1/2005 | Park et al. | 349/40 |
| 6,906,347 | B2 | * | 6/2005 | Yamazaki et al. | 257/72 |
| 2003/0147018 | A1 | * | 8/2003 | Sano et al. | 349/42 |
| 2005/0243260 | A1 | * | 11/2005 | Kim | 349/149 |
| 2005/0275780 | A1 | * | 12/2005 | Hisatake | 349/120 |
| 2006/0087612 | A1 | * | 4/2006 | Kuan et al. | 349/165 |

FOREIGN PATENT DOCUMENTS

| JP | 5-072545 | | 3/1993 |
| JP | 11-352508 | A | 12/1999 |
| JP | 2000-147557 | | 5/2000 |
| JP | 2001-249345 | | 9/2001 |
| JP | 2001-330821 | A | 11/2001 |
| JP | 2002-006339 | | 1/2002 |
| JP | 2002-244146 | | 8/2002 |
| JP | 2003-149668 | A | 5/2003 |

OTHER PUBLICATIONS

Machine translation of Abu et al., Japanese Patent Application Publication 2000-147557, Dec. 2, 2008. pp. 9, 17, 19, 20, and 23 are pertinent.*
T. Nishihata, Machine translation of JP 2002-006339.*
Translation of Jul. 18, 2008 Chinese Official Action in Chinese Patent Appln. No. 200710108170.1.
Japanese Office Action dated Sep. 13, 2011, in counterpart Japanese Application No. 2006-149894.

* cited by examiner

*Primary Examiner* — Mark Robinson
*Assistant Examiner* — Michael Inadomi
(74) *Attorney, Agent, or Firm* — Fitzpatrick, Cella, Harper & Scinto

(57) ABSTRACT

A plurality of liquid crystal modulation electrodes is arranged in a matrix on a semiconductor substrate 28, a light transmitting substrate 47 with a transparent electrode 23, and a semiconductor substrate are laminated together with liquid crystal interposed therebetween, the semiconductor substrate is connected to a flexible printed board 25 electrically connecting to an external circuit, the transparent electrode is connected to the wiring of the flexible printed board not through the semiconductor substrate, and the wiring is connected to the semiconductor substrate, whereby the transparent electrode is electrically connected to the semiconductor substrate. The semiconductor substrate 28 is provided with an anti-electrostatic protection circuit and the transparent electrode is connected to the anti-electrostatic protection circuit through the wiring.

5 Claims, 7 Drawing Sheets

LIQUID CRYSTAL DISPLAY AND LIQUID CRYSTAL PROJECTOR

BACKGROUND OF THE INVENTION

1. Field of the Invention

The present invention relates to a liquid crystal display, a liquid crystal projector, and a rear projection apparatus for displaying images and characters using liquid crystals, and in particular, to a projection type of liquid crystal display, liquid crystal projector, and rear projection apparatus.

2. Description of the Related Art

In the multimedia era of nowadays, there has been an increasing demand for an apparatus for communication with picture data. Among other things, a liquid crystal display attracts public attention because it is thinner and less power-consuming and has already developed into a key industry comparable to the semiconductor industry. As a liquid crystal display gets larger in screen size, a production equipment therefore becomes expensive and a liquid crystal display is required to satisfy electrically severe characteristics to drive a larger screen. For this reason, attention has been called to a projection type of liquid crystal display in which a small liquid crystal display panel is prepared and a picture displayed thereon is optically enlarged to be displayed. This is because reduction in screen size enables improving characteristics and reducing cost at the same time, as is the case with a scaling law in which as a semiconductor becomes finer, performances and cost are improved. The liquid crystal display panel is typically connected to an external system with a wire bonding or an anisotropic conductive film.

The point different from a general semiconductor circuit in connection is that the liquid crystal display panel takes electric potential on a light transmitting substrate such as an opposing glass substrate. Japanese Patent Application Laid-Open No. H05-72545 describes a method of taking electric potential wherein an electrode of a glass or resin substrate is directly connected to a flexible printed board by Ag paste in a liquid crystal display panel using a light transmission substrate such as glass or resin substrate. Japanese Patent Application Laid-Open Nos. 2001-249345 and 2002-006339 describe another method wherein electrodes are connected to wirings on the silicon substrate side by conductive material. FIG. 11 is a cross section illustrated in Japanese Patent Application Laid-Open No. 2002-006339. As illustrated in FIG. 11, a first substrate 202 is provided with a common wiring 203 and external connection terminal 204 and a second substrate 212 is provided with an opposite electrode 211. Liquid crystal 215 is sealed between the first and the second substrate 202 and 212. An external connection area 233 and a conductive connection portion 232 such as Ag paste are also illustrated in the figure.

SUMMARY OF THE INVENTION

Japanese Patent Application Laid-Open No. H05-072545 describes nothing about the electrical connection of the substrates interposing liquid crystal, in particular, the electrical connection of a light transmitting substrate to a silicon substrate between which liquid crystal is interposed. Electric potential is directly taken from the electrode of the light transmitting substrate to be connected to a flexible printed board and electrically connected to an external circuit, which causes a problem with difficulty in preventing static electricity.

On the other hand, methods described in Japanese Patent Application Laid-Open Nos. 2001-249345 and 2002-006339 cannot cause a conductive particle to connect the electrode of the light transmitting substrate to a underlying circuit as long as the conductive particle is larger in size than a spacer defining the gap between the substrates sealing liquid crystal. This creates problems in that it becomes difficult to control the gap between the substrates sealing liquid crystal and a liquid crystal process becomes complicated.

The present invention has for its purpose to provide a liquid crystal display with a configuration capable of preventing static electricity without disturbing the gap between the substrates sealing liquid crystal. In addition, it has for its purpose to realize a configuration capable of taking electric potential of the electrode of the light transmitting substrate without complicating the process and preventing a local force decreasing a yielding ratio from being exerted on a liquid crystal.

A liquid crystal display according to the present invention for solving the above problems, in which a plurality of liquid crystal modulation electrodes is arranged in a matrix on a semiconductor substrate and a light transmitting substrate with a transparent electrode is laminated with the semiconductor substrate between which liquid crystal is interposed, is characterized in that the semiconductor substrate is connected to a printed circuit board electrically connecting to an external circuit, the transparent electrode is connected to the wiring of the printed circuit board not through the semiconductor substrate, and the wiring is connected to the semiconductor substrate, thereby the transparent electrode is electrically connected to the semiconductor substrate.

According to the present invention, it is enabled to electrically connect the light transmitting substrate to the semiconductor substrate without disturbing the gap between which liquid crystal is sealed. An anti-electrostatic protection circuit is provided on the semiconductor substrate to enable protecting the substrate from electrostatic charge. It is also enabled to realize a configuration capable of taking electric potential of the electrode of the light transmitting substrate without complicating the process and preventing a local force likely decreasing a yielding ratio from being exerted on a liquid crystal.

Further features of the present invention will become apparent from the following description of exemplary embodiments with reference to the attached drawings.

DESCRIPTION OF THE EMBODIMENTS

The embodiments of the present invention are described in detail below with reference to the drawings.

First Embodiment

Figure 1:
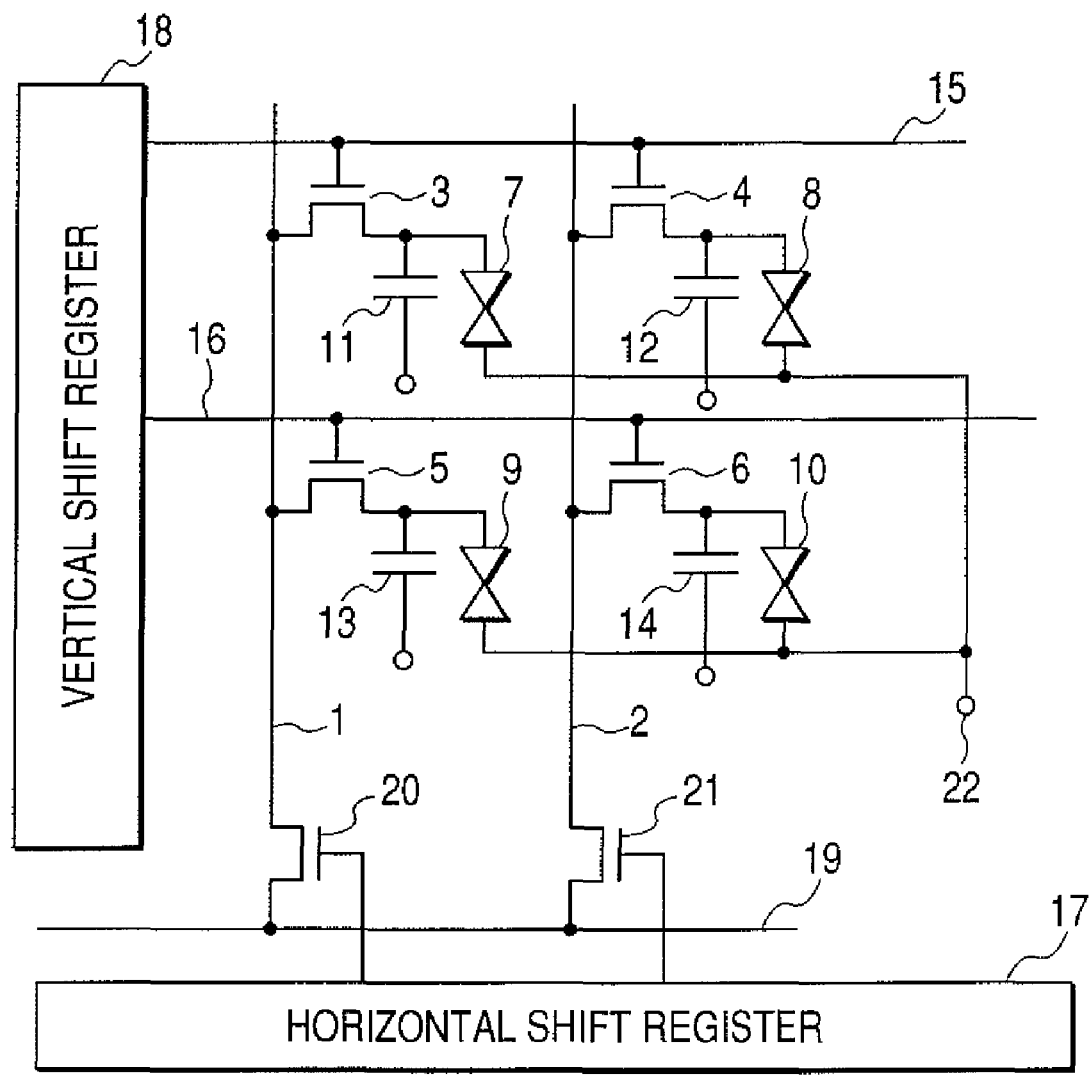
FIG. 1 is an equivalent circuit diagram of a liquid crystal display according to the present invention.

The first embodiment of the present invention is described in detail with reference to FIG. 1. FIG. 1 is a schematic diagram of a liquid crystal display in the present embodiment is used in a liquid crystal projector and one example of an equivalent circuit diagram of the liquid crystal display. For simplification purposes, the figure illustrates 2 ×2 pixels only.

In FIG. 1, the circuit diagram includes signal lines 1 and 2, switching transistors 3 to 6 of pixels, liquid crystal 7 to 10, holding capacitors 11 to 14 of the pixels, driving lines (scanning lines) 15 and 16, and horizontal shift register 17 for scanning the signal lines 1 and 2. The circuit diagram further includes a vertical shift register 18 for scanning the driving lines 15 and 16, video line 19, sampling switches 20 and 21 from the video line 19 to the signal lines 1 and 2 and opposite electrode (transparent electrode) 22 on a glass substrate (light transmitting substrate) being a second substrate. The horizontal shift register 17, the vertical shift register 18, switching transistors 3 to 6, holding capacitors 11 to 14 and sampling switches 20 and 21 are formed over the semiconductor substrate such as a silicon substrate being a first substrate.

The operation of the liquid crystal display according to the present embodiment is briefly described. In FIG. 1, for simplification purposes, only 2×2 pixels are illustrated. Actually, however, X pixels×Y pixels are arranged in a matrix, where, X and Y are a natural number of 2 or more. In Super extended Graphics Array plus (SXGA+), for example, 1400 pixels× 1050 pixels are arranged.

In FIG. 1, the vertical shift register 18 inputs a signal into the scanning the driving line 15 to turn on switching transistors 3 and 4 of pixels. While the switching transistors are being turned on, the horizontal shift register 17 sequentially turns on the sampling switches 20 and 21 to cause the video line 19 to transmit signals to the signal lines 1 and 2. Specifically, the sampling switch 20 is opened to write the signal of the video line 19 into the signal line 1. Then, electric charge is stored into the holding capacitor 11 through the switching transistor 3 of the pixel. Voltage is applied across the liquid crystal 7 between the opposite electrode 22 and the holding capacitor 11. After the sampling switch 20 was closed, the sampling switch 21 is opened to write the signal of the video line 19 into the signal line 2. Then, electric charge is stored into the holding capacitor 12 through the switching transistor 4 of the pixel. Voltage is applied across the liquid crystal 8 between the opposite electrode 22 and the holding capacitor 12. Thus, signals are sequentially written into pixels connected to the driving line 15 (or, electric charges are sequentially stored into the holding capacitors to write signals into pixels). After signals were written into all pixels connected to the driving line 15, the driving line 15 is turned off. A signal is input into the driving line 16 to turn on switching transistors 5 and 6. As is the case with operation of the pixels connected to the driving line 15, signal are written into the pixels connected to the driving line 16. After writing signals into all the pixels of the panel has been finished, this operation is repeated again.

An alternating-current voltage is typically applied to a pixel electrode (a liquid crystal modulation electrode) provided opposite to the opposite electrode 22 to avoid burning; for example, a voltage of ±5 V with respect to a center voltage of 6 V, that is to say, 1 to 11 V is written. The center voltage is a voltage of the opposite electrode 22.

Figure 2A:
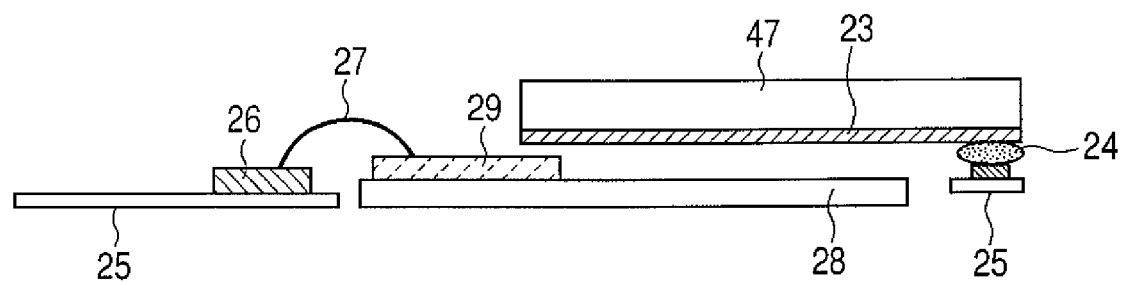
FIG. 2A is a cross section of the liquid crystal display describing a first embodiment according to the present invention.
Figure 2B:
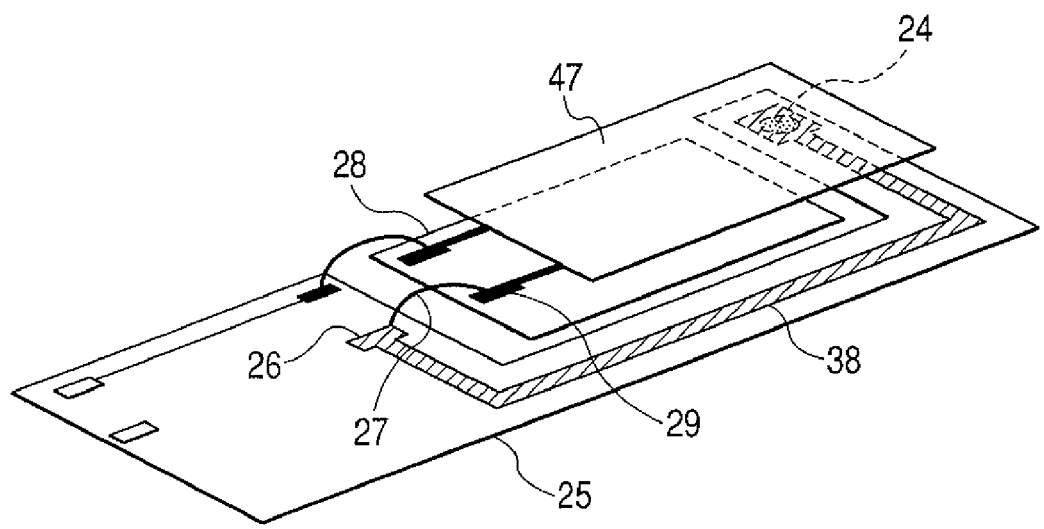
FIG. 2B is a perspective view of the liquid crystal display describing the first embodiment according to the present invention.

FIGS. 2A and 2B are a cross section and a perspective view of the liquid crystal display including an electrode extracting portion respectively. In FIGS. 2A and 2B, an opposite electrode 23 (corresponding to the opposite electrode 22) being a transparent electrode such as an ITO electrode on the glass substrate 47 is connected to a flexible printed board 25 by a conductive paste portion 24 such as Ag paste. A wiring 38 of the flexible printed board 25 is routed and connected to a pad portion 29 on the side of a silicon substrate (semiconductor substrate) 28 from a PAD portion 26 of the flexible printed board 25 through a wire bonding 27.

Figure 3:
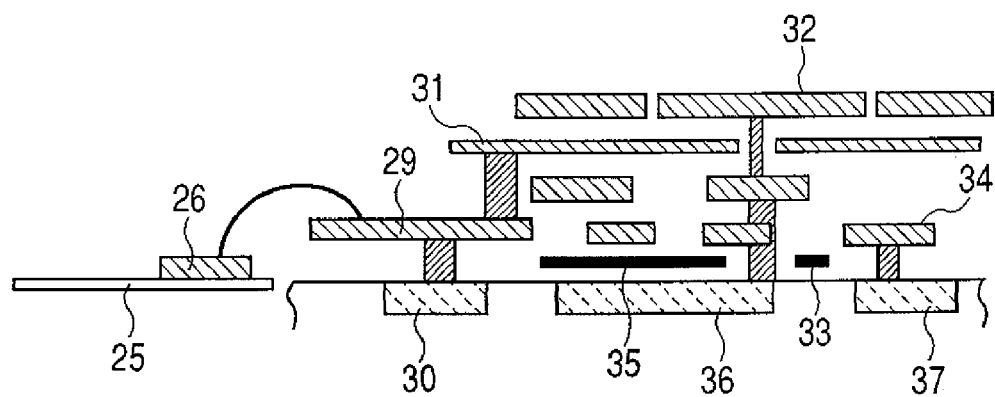
FIG. 3 is a cross section of the liquid crystal display describing the first embodiment according to the present invention.

FIG. 3 is a detailed diagram of the pad portion including an anti-electrostatic protection circuit 30 connected to the pad portion 29, which is, for example, a diode circuit or power rail clamping circuit. In the figure, the pad portion 29 is connected to a light shielding layer 31 being another electrode. The light shielding layer 31 serves to preclude light incident from the gap of pixel electrodes 32 being reflection electrodes from being incident on switching transistors at a lower layer. It is desirable that the light shielding layer 31 has the same voltage as the opposite electrode 23 (ITO electrode) not to produce voltage therebetween, so that the light shielding layer 31 is electrically connected to the opposite electrode 22 in the present embodiment. A poly-silicon electrode 35 is arranged opposed to a drain 36 of the switching transistor to form the holding capacity of the pixel. The pad further includes a gate 33 of the switching transistor, signal line 34 and source 37 of the switching transistor.

Figure 4:
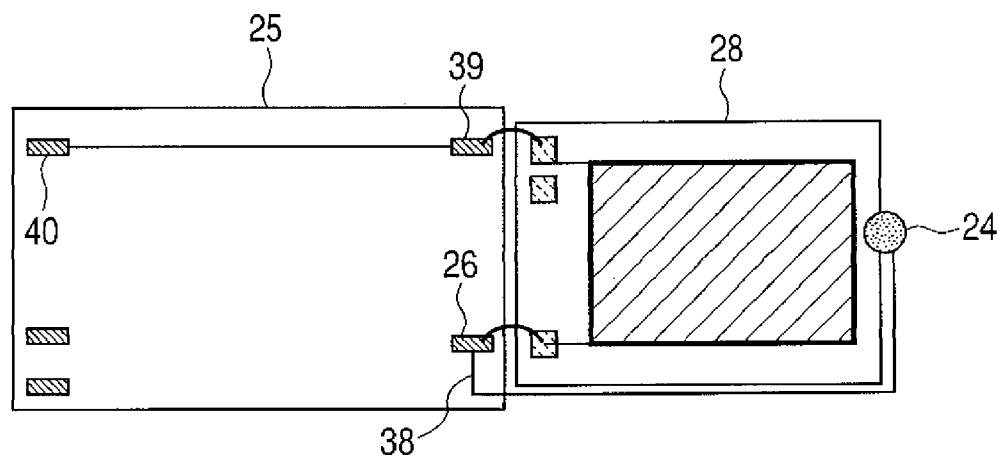
FIG. 4 is a top view of the liquid crystal display describing the first embodiment according to the present invention.

FIG. 4 is a top view of the liquid crystal display according to the present embodiment. A wire 38 on the flexible printed board (FPC) 25 is included in the figure. A character "L" portion of the flexible printed board (FPC) where a wiring 38 is formed from the conductive paste portion 24 to the pad portion 26 is omitted and the flexible printed board circuit (FPC) 25 illustrated is rectangular.

A pad portion 39 of the flexible printed board (FPC) 25 is provided as the outlet (or inlet) of a wiring which enters the silicon substrate 28 being a first substrate from the pad portion 26. The pad 39 is connected to the silicon substrate 28 by the wire bonding 27 and its wiring extends to a terminal 40. Such a structure causes the anti-electrostatic protection circuit 30 in the silicon substrate to absorb electrostatic charge entering from the terminal 40 before it reaches the electrode on the opposite electrode 23 such as the glass substrate.

The liquid crystal display of the present embodiment is capable of protecting the opposite electrode of the glass substrate against electrostatic charge, which has provided a high reliability at an electrostatic charge of 150 V or higher in a machine model. A liquid crystal display which imposes only a slight burden on the production process and is higher in yield can be realized. Since conduction is not established by interposing between the glass substrate and silicon substrate, the gap is not dispersed to provide a good image quality. In the present embodiment, although the silicon substrate and the glass substrate are laminated together with the one side of the glass substrate shifted, the glass substrate can be made larger. It is to be understood that it is not limited to this configuration. In the present embodiment, although Ag paste is used to connect the flexible printed board, it is not limited to Ag paste; anisotropic conductive film (ACF) or ordinary wire bonding may be used.

Figure 5:
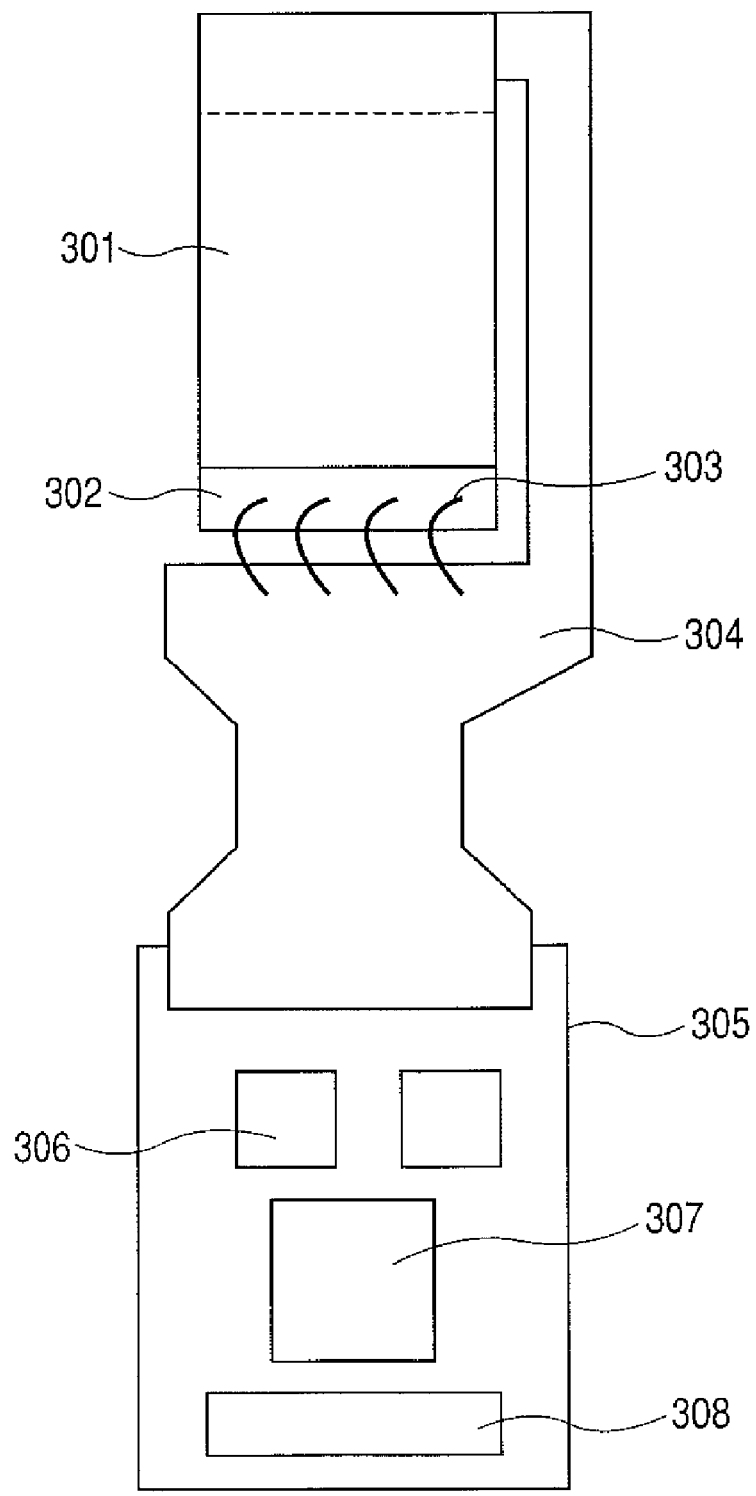
FIG. 5 is a top view illustrating how a circuit board is connected to the flexible printed board of the liquid crystal display in the first embodiment according to the present invention.
Figure 6:
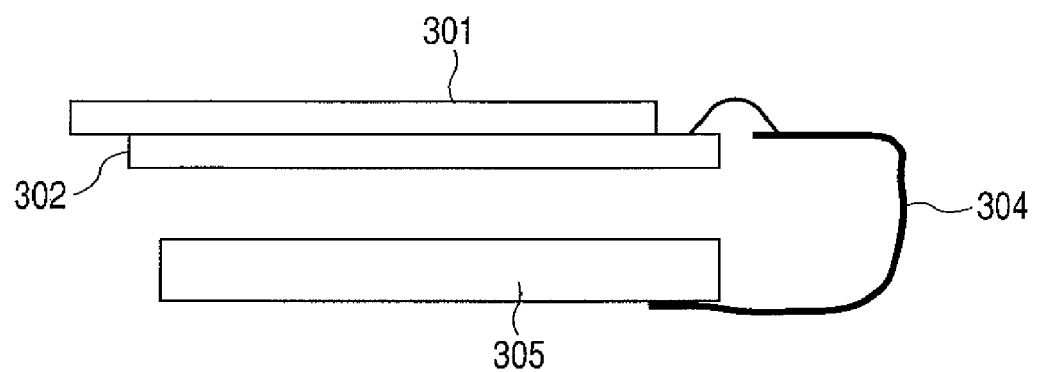
FIG. 6 is a cross section of a curved flexible printed board.

FIG. 5 is a top view illustrating how a circuit board is connected to the flexible printed board of the liquid crystal display in the present embodiment. FIG. 6 is a cross section of the curved flexible printed board.

Figure 7:
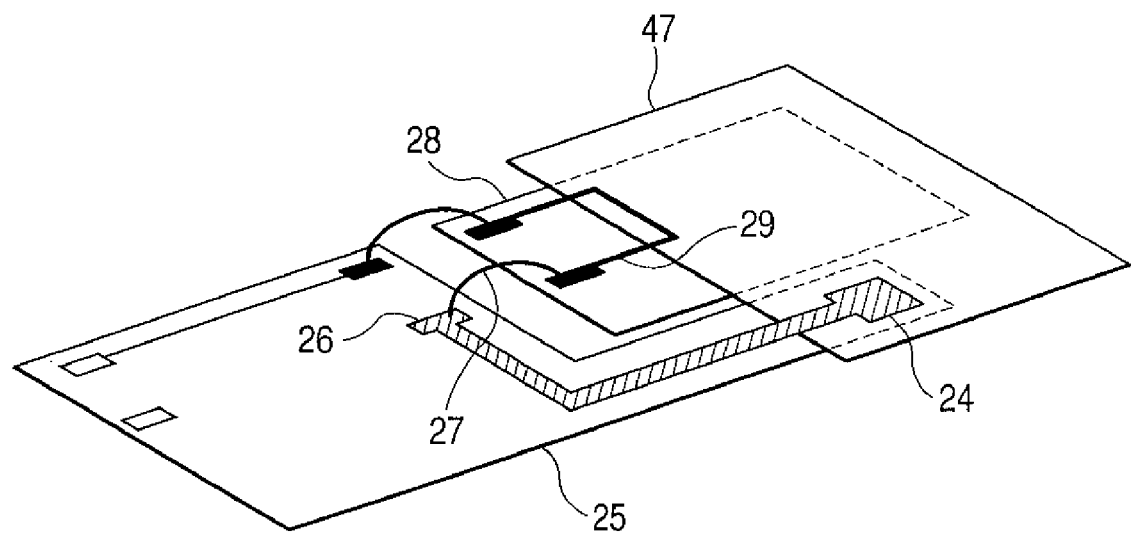
FIG. 7 is a perspective view of the liquid crystal display describing another configuration in the first embodiment according to the present invention.

FIGS. 5 and 6 illustrate a glass substrate 301, silicon substrate 302, wire bonding 303, and flexible printed board 304 which are the same as ones in the reflection type liquid crystal display illustrated in FIGS. 1 to 4. Further illustrated are a circuit board 305, control ICs 306 and 307 for driving the liquid crystal display, and connector 308. Incidentally, in FIG. 2, the glass substrate 47 is shifted to the side opposite to the wire bonding side and the glass substrate is connected to the flexible printed board. As illustrated in FIG. 7, the glass substrate 47 may be shifted in parallel to the direction in which the pad portion (pad portion 29 or the like) of the silicon substrate is arranged and the glass substrate may be connected to the flexible printed board.

The above describes the case where the pad portion 29 connected to the opposite electrode 23 being the transparent electrode is connected to the light shielding layer 31 being another electrode. However, the another electrode is not limited to that, but it may be an electrode (wherein, drain electrode 36) for forming holding capacitor, for example. In that case, the poly-silicon electrode 35 is connected to pixel electrode 32. Thus, the connection of the pad portion 29 to the light shielding layer 31 or the poly-silicon electrode 35 of the holding capacity eliminates the need for providing the pad portion for taking electric potential of the light shielding layer 31 or the poly-silicon electrode 35 of the holding capacity, enabling the number of pads (PAD) to be reduced.

Second Embodiment

Figure 8:
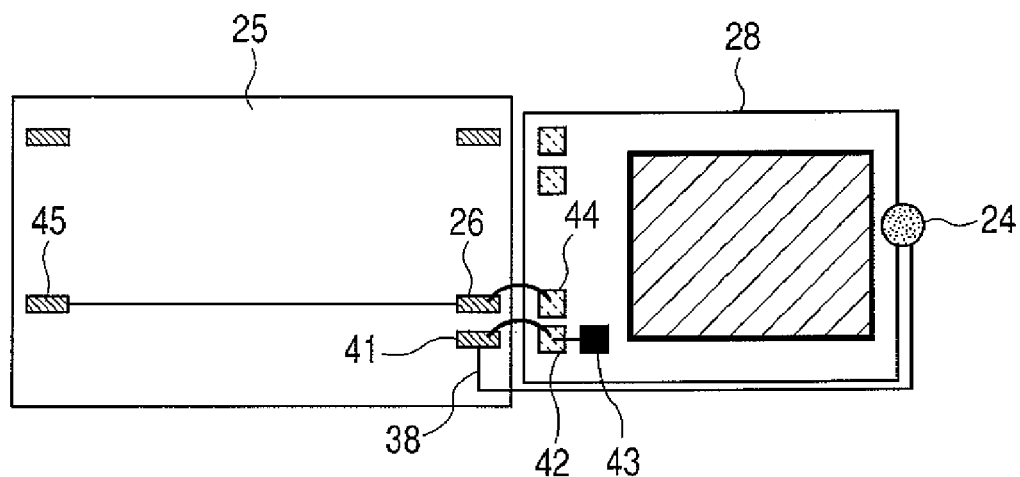
FIG. 8 is a top view of the liquid crystal display describing a second embodiment according to the present invention.

The second embodiment of the present invention is described with reference to FIG. 8. The wiring 38 connected to the flexible printed board (FPC) from the opposite electrode such as the ITO electrode on the glass substrate enters the pad portion 42 of the silicon substrate (semiconductor substrate) 28 from the pad portion 41. An anti-electrostatic protection circuit 43 is connected to the pad portion 42. The pad portion 42 is further connected to the neighboring pad portion 44 and the pad portion 26 of the flexible printed board (FPC) 25 through wire bonding. In the present embodiment, the terminal 45 is connected to the opposite electrode such as the ITO electrode on the glass substrate through the pad portions 26, 44, 42, and 41. The anti-electrostatic protection circuit 43 connected to the pad portion prevents the discharge of electrostatic charge entering the silicon substrate. Although the number of pads is greater than that of the first embodiment, a good quality liquid crystal display with anti-electrostatic protection can be supplied.

Third Embodiment

A liquid crystal projector using the above first and second embodiments is described with reference to FIG. 9.

Figure 9:
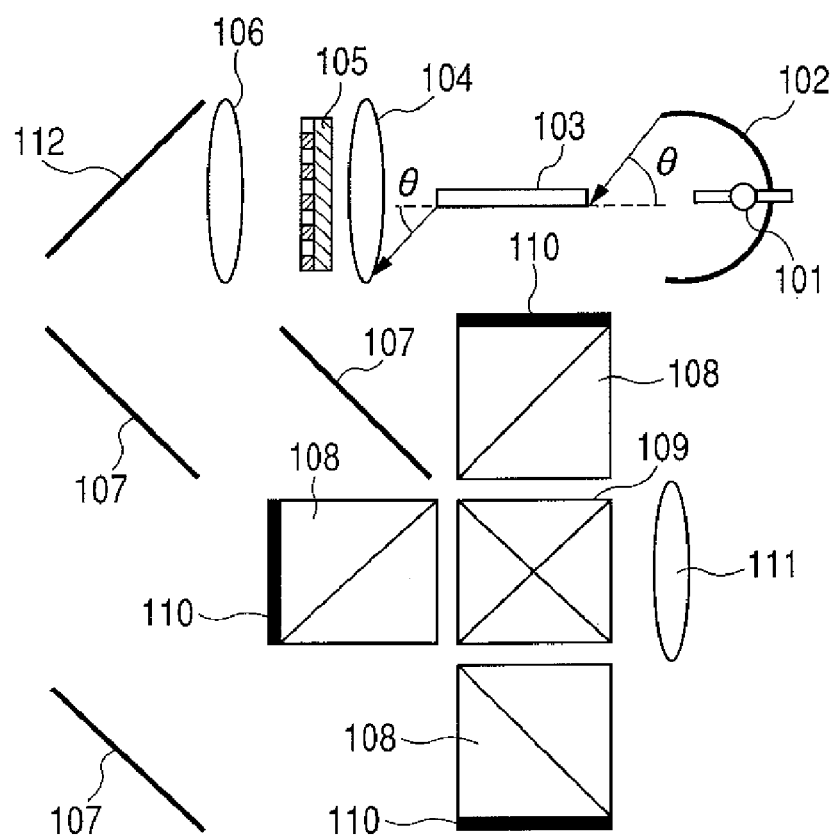
FIG. 9 is a diagram describing a liquid crystal projector using the liquid crystal display according to the present invention.

FIG. 9 is one example of a liquid crystal projector. The liquid crystal projector includes a lamp 101, reflector 102, rod integrator 103, collimator lens 104, polarization conversion system 105, relay lens 106 and dichroic mirror 107. It further includes a polarization beam splitter 108, cross prism 109, liquid crystal panel 110, projection lens 111 and total reflection mirror 112. A liquid crystal panel 110 uses the liquid crystal display illustrated in FIGS. 5 and 6.

Light beams emitted from the lamp 101 are reflected by the reflector 102 and are converged at the inlet of the integrator 103. The reflector 102 is elliptic and its focal point lies at a light emission unit and the inlet of the integrator. The light beams having entered the integrator 103 are reflected several times inside the integrator 103 and form a secondary light source image at the outlet of the integrator. Although a secondary light source image can be formed by using a fly eye lens, the method is omitted herein. The light beams from the secondary light source are converted into substantially parallel light through the collimator lens 104 and are incident on the polarization beam splitter 105 of the polarization conversion system. A P wave is reflected by the polarization beam splitter 105, and passes through a $\lambda/2$ plate, where all waves are converted to S waves to fall on a relay lens 106. The light beams are converged on the panel by the relay lens 106. While the light beams are being converged on the panel, a color separation system is formed by the color separation dichroic mirror 107, polarizing plate (not shown), polarization beam splitter 108, and cross prism 109 to cause the S wave to be incident on three liquid crystal panels 110. Liquid crystal shutters in the liquid crystal panels 110 control voltage for each pixel according to images. In general, the S wave is modulated into an elliptically polarized light (or linearly polarized light) by the effect of liquid crystals and P wave components are transmitted by the polarization beam splitter 108, color-synthesized by the cross prism 109 and then projected by the projection lens 111.

The liquid crystal projector of the present embodiment can be disposed in a casing and project image light onto a wall or a dedicated screen. In addition, the liquid crystal projector of the present embodiment can be used in a rear projection apparatus such as a rear projection television. That is to say, as illustrated in FIG. 10, a reflective mirror 310, Fresnel lens 311 being a screen, lenticular lens 312 as well as the liquid crystal projector of the present embodiment (only the projection lens is illustrated herein) are disposed in a casing, enabling forming a rear projection apparatus such as rear projection television.

Figure 10:
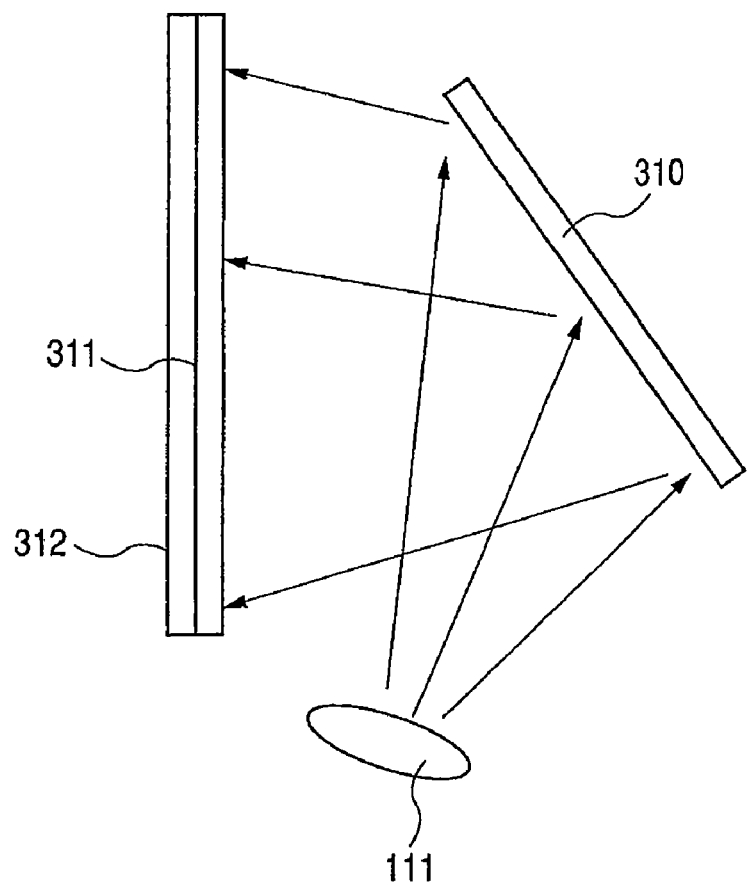
FIG. 10 is a diagram describing a rear projection apparatus using the liquid crystal display according to the present invention.
Figure 11:
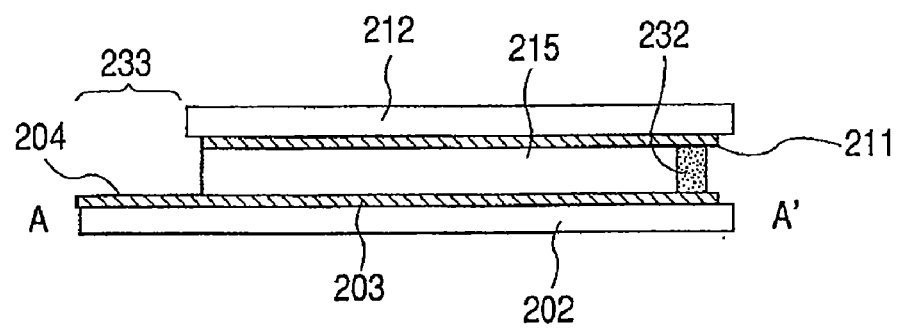
FIG. 11 is a diagram illustrating an example of a conventional liquid crystal display.

As illustrated in FIG. 10, light from the projection lens 111 of the liquid crystal projector is reflected by the reflective mirror 310 to be projected onto the rear face of the screen (or, light may be projected not through the reflective mirror), converted into parallel light by the Fresnel lens 311 and dispersed over a wide angle through the lenticular lens 312.

The liquid crystal projector of the present embodiment can be used for both a front projection type (system for projecting image light onto a wall or a dedicated screen) and a rear projection type (system for projecting image light onto a rear face of the screen, enabling a viewer to watch transmitted light on the screen).

As described above, in the liquid crystal display of the present embodiment, even the transparent electrode on the light transmitting substrate such as a glass substrate is protected against electrostatic charge to significantly reduce failure rates. The dispersion of the gap between the light transmitting substrate and semiconductor substrate such as silicon substrate can be reduced, which allows forming a liquid crystal projector with a good picture quality having less unevenness in luminance and color.

In the description of the foregoing embodiments, although the opposite electrode was taken to be a transparent electrode, portions of the opposite electrode which are independent of image display may be an opaque electrode such as metal or an electrode lower in transmittance than the transparent electrode. For example, the portion connected to the conductive paste portion 24 may be formed by an electrode such as a metallic electrode connected to the portion of the transparent electrode.

Although the reflective type of liquid crystal display and the liquid crystal projector using the reflective type of liquid crystal display were described in the foregoing embodiments, the present invention can be applied to a transmission type liquid crystal display and a liquid crystal display projector using the transmission type liquid crystal display.

The present invention can be used for a liquid crystal display, liquid crystal projector, and rear projection apparatus for displaying images and characters using liquid crystal, and in particular, for a projection type of liquid crystal display, liquid crystal projector, front projection apparatus, and rear projection apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Laid-Open No. 2006-149849, filed May 30, 2006, which is hereby incorporated by reference herein in its entirety.

What is claimed is:

1. A liquid crystal display comprising:
a light transmitting substrate with a transparent electrode;
a liquid crystal;
a semiconductor substrate which is provided opposite to the light transmitting substrate with the liquid crystal interposed therebetween, wherein the semiconductor substrate has a plurality of liquid crystal modulation electrodes arranged in a matrix; and
a printed board having a wiring electrically connected to the semiconductor substrate and the transparent electrode,
wherein the semiconductor substrate has an anti-electrostatic protection circuit connected to a pad portion on the semiconductor substrate, and
wherein the wiring is electrically connected to the transparent electrode not through the semiconductor substrate, and is also electrically connected to the anti-electrostatic protection circuit, and the transparent electrode is electrically connected to the pad portion through the wiring.

2. The liquid crystal display according to claim 1, wherein the printed board has another wiring electrically connected to the semiconductor substrate.

3. The liquid crystal display according to claim 1, wherein the pad portion is connected to an another electrode in the semiconductor substrate, the another electrode is a light shielding layer arranged opposite to the side where the liquid crystal is arranged, with respect to the liquid crystal modulation electrode.

4. The liquid crystal display according to claim 1, wherein the liquid crystal modulation electrode is a reflection electrode.

5. A liquid crystal projector comprising:
a liquid crystal display according to claim 1; and
a light source emitting a light to the liquid crystal display.

* * * * *